United States Patent [19]
Marin

[11] Patent Number: 4,803,552
[45] Date of Patent: Feb. 7, 1989

[54] VERTICAL BLANKING INTERVAL STANDARDIZER CIRCUIT

[75] Inventor: Roger A. Marin, Portland, Oreg.

[73] Assignee: Xantech Corporation, Sylmar, Calif.

[21] Appl. No.: 937,494

[22] Filed: Dec. 3, 1986

[51] Int. Cl.$^4$ ............................................. H04N 5/04
[52] U.S. Cl. .................................. 358/148; 358/141; 358/165
[58] Field of Search ................... 380/15; 358/319, 335, 358/148, 149, 150, 152, 153, 155, 156, 157, 141, 170, 171, 172, 165; 360/37.1

[56] References Cited

U.S. PATENT DOCUMENTS

| | | | |
|---|---|---|---|
| 2,492,943 | 12/1949 | White | 358/155 |
| 3,005,869 | 10/1961 | Dolby | 358/148 |
| 4,336,554 | 6/1982 | Okada | 358/124 |
| 4,577,216 | 3/1986 | Ryan | 358/19 |
| 4,695,901 | 9/1987 | Ryan | 380/5 |

OTHER PUBLICATIONS

"Color Video Processor DP-100 Instruction Manual" Mincom Division, 3M Company.
"Ampex 1085 Amplifier Instruction Manual" Ampex Corp.
"JVC JX-C7 Processor Amplifier Service Manual" 10/84.
"JVC JX-C7 Processor Amplifier Supplemental Service Manual" 12/84.

Primary Examiner—James J. Groody
Assistant Examiner—David E. Harvey
Attorney, Agent, or Firm—Wm. Bruce Day

[57] ABSTRACT

A vertical blanking interval standardizer circuit detects the vertical synchronization interval of a video signal and generates a vertical block sync pulse which replaces a serrated vertical sync signal in which the pulse spacing has been modified in a non-standard manner. An early control pulse existing from the beginning of the vertical blanking interval until the trailing edge of the vertical block sync pulse and a late control pulse existing from the trailing edge of the vertical block sync pulse until the end of the vertical blanking interval are generated. The early and late control pulses pre-bias an amplitude limiter transistor such that the transistor is reverse biased by signal components during the vertical blanking interval which exceed a selected blanking level. In this manner, pulses occurring during the vertical blanking interval which have a gray or a white level are blocked and replaced by the selected blanking level.

10 Claims, 2 Drawing Sheets

VERTICAL BLANKING INTERVAL STANDARDIZER CIRCUIT

FIELD OF THE INVENTION

The present invention relates to video signal processing circuitry and, more particularly, to such circuitry for limiting the amplitude of signals occurring during the vertical blanking interval of a video signal and for replacing a serrated vertical sync signal by a vertical block sync pulse.

BACKGROUND OF THE INVENTION

The proprietors of copyrights in pre-recorded video cassettes and their publishers have taken a number of measures to discourage and prevent the unauthorized duplication of such cassettes. In typical unilateral copy prevention techniques, the video signal being transferred to a pre-recorded tape is modified in such a manner that, at least theoretically, the modified signal will play properly on a television set during normal playback on a video cassette recorder (VCR) but will disturb the operation of a duplicating VCR in such a manner that the unauthorized tape copy will not play back properly. In unilateral copy protection schemes, only the signal on the pre-recorded tape is modified. Bilateral schemes have also been proposed in which a signal incorporated during the pre-recording process cooperates with copy prevention circuitry in a VCR. The present invention is only concerned with certain unilateral copy prevention techniques.

In the most common current copy prevention schemes, the video signal is modified during the vertical blanking interval. In one such technique, the pulse spacing in the serrated vertical sync interval is altered in such a way that when the serrated vertical sync signal portion is integrated, as is commonly done to recover the vertical field synchronization information, the output level is less than if a standard pulse spacing were present. In theory, the modified integrated vertical sync level is high enough to avoid visible effects on a "standard" television set, but not high enough to properly synchronize the helical scan drum on a VCR which transports the tape past the recording head. The usual result is that when a modified prerecorded tape is duplicated and the duplicate tape played, the image contains vertically moving noise bands.

In another such copy prevention technique, the video signal is modified to place spurious sync pulses in the vertical blanking interval, each such pulse immediately followed by a pulse having a peak white level or at least a "gray" level substantially "whiter" than a reference blanking level. The intended effect is to cause misadjustment of an automatic gain control (AGC) circuit in the copying VCR which sets the amplitude of the video signal being recorded by reference to an expected blanking level immediately following a pulse having a standard sync tip level. If the AGC circuit references to a white level or a level more positive (conventionally) than a standard blanking level, the AGC circuit adjusts the video amplitude in a diminished direction during recording. When the tape is subsequently played, the brightness is correspondingly diminished. If the modification is constant in amplitude and period, the viewer could manually adjust the brightness and contrast controls of the television set to compensate somewhat for the diminished video signal amplitude, although an overall loss in picture contrast might be uncorrectable. However, the insertion of gray and peak white pulses is often done on a random basis to prevent such a simple correction.

The above described copy prevention techniques are premised on the assumption that the video signal modifications will adversely affect the recording of video signals so modified but will not have any adverse effects on the playing of the modified signal on "standard" television sets. While television sets are designed to accommodate video signals adhering to certain standards, there are variations in the tolerances by which television sets are manufactured and in the picture controls which are provided on any given model.

In practice, it has been found that some television sets experience adverse image effects during the playback of original pre-recorded tapes incorporating such modifications. When the tapes have been modified by the vertical sync interval modification, the image effect on such television sets is an inability to synchronize vertically or vertical "rolling". This effect can be overcome by adjustment of the vertical hold control on the set. However, many current television sets perform the vertical hold function automatically and do not provide for manual vertical hold adjustment. With the insertion of gray and white pulses, some televisions adjust their AGC's by referencing to these pulses which causes a fading and blasting of image brightness level. When the pulses occur on a random time and level basis, there is no control on conventional television sets which can correct the effect.

It is emphasized that these adverse effects occur with some, though not all, television sets connected to VCR's and during the playback of the modified tapes in the manner intended by the publisher. That is, a viewer has paid to purchase or rent a tape which is virtually useless because of incompatabilities between his particular combination of video equipment and the video signal modification on the tape. While the viewer can often get a reimbursement from the tape vendor, inconveniences are suffered by the viewer and the vendor. Further, it is sometimes impossible for a viewer to find operable pre-recorded tapes of desired movies.

SUMMARY OF THE INVENTION

The present invention overcomes the adverse effects of the above described copy prevention techniques on certain television sets by standardizing the vertical blanking interval of the video signal coming from a pre-recorded tape playing in a VCR. In general, the standardizer circuit detects the vertical blanking interval, and limits the amplitude of the video signal during this interval to negate the effect of the white and gray pulses. The vertical blanking interval is detected by detecting the vertical sync interval and by dividing the vertical blanking interval into an early portion and a late portion with respect to the vertical sync interval. The modified pulse spacing in the serrated vertical sync signal is overcome by generating a vertical block sync pulse which replaces the serrated vertical sync interval in the video signal. The trailing edge of the vertical block sync pulse is used as a timing reference for the early and late portions of the vertical blanking interval.

The video signal is limited in amplitude during the vertical blanking interval by passage through an amplitude limiter transistor which is pre-biased in a timed manner during the early and late portions of the vertical blanking interval to limit the amplitude of the video signal to a blanking level. By this means, the white and gray pulses are effectively blocked while the image containing portions of the video signal and the standard sync pulses are unaffected. The amplitude limiter transistor is selectively biased by early and late control pulse generators.

The early control pulse generator outputs an early control level in a rest state thereof from substantially the beginning of the vertical blanking interval until at least the beginning of the vertical sync interval. The early pulse generator is switched into its active state by the trailing edge of the vertical block sync pulse and remains in the active state until the beginning of the vertical blanking interval of the next video field at which time it reverts to the rest state and outputs a voltage level which activates the early control transistor. The late control pulse generator activates the late control transistor from the trailing edge of the vertical block sync pulse until the end of the vertical blanking interval.

During the activation of either the early or late control transistors, the limiter transistor is pre-biased such that the signal levels of the gray or peak white pulses reverse bias the limiter transistor cutting it off. During this short cutoff period, the output level of the activated controller transistor is substituted for the gray or white pulse level. The output level of the controller transistors is at the blanking level of the video signal.

OBJECTS OF THE INVENTION

The principal objects of the present invention are: to provide a circuit for standardizing the components of a video signal occurring during the vertical blanking interval of the video signal from a VCR playing a pre-recorded tape in which such components have been modified; to provide such a circuit to allow the successful playing of such modified pre-recorded tapes on a VCR/television set combination wherein the television set is adversely affected by such modifications; to provide such a circuit which limits the amplitude of pulses occurring during the vertical blanking interval of a video signal to a selected blanking level; to provide such a circuit which divides the vertical blanking interval into an early portion and a late portion with respect to the vertical sync interval of the vertical blanking interval; to provide such a circuit which limits levels in the early portion of the vertical blanking interval of a given field by means of an early control pulse generated in the vertical blanking interval of the previous field; to provide such a circuit which replaces a serrated vertical sync signal occurring during the vertical sync interval of a video signal by a vertical block sync pulse; to provide such a circuit including a lock adjustment control to allow manual synchronization of the vertical block sync pulse with the vertical sync interval of the video signal; and to provide such a vertical blanking interval standardizer circuit which is economical to manufacture, precise in operation, and which is particularly well adapted for its intended purpose.

Other objects and advantages of the present invention will become apparent from the following description taken in conjunction with the accompanying drawings wherein are set forth, by way of illustration and example, certain embodiments of this invention.

The drawings constitute a part of the specification, include an exemplary embodiment of the present invention, and illustrate various objects and features thereof.

DETAILED DESCRIPTION OF THE PREFERRED EMBODIMENT

Figure 1:
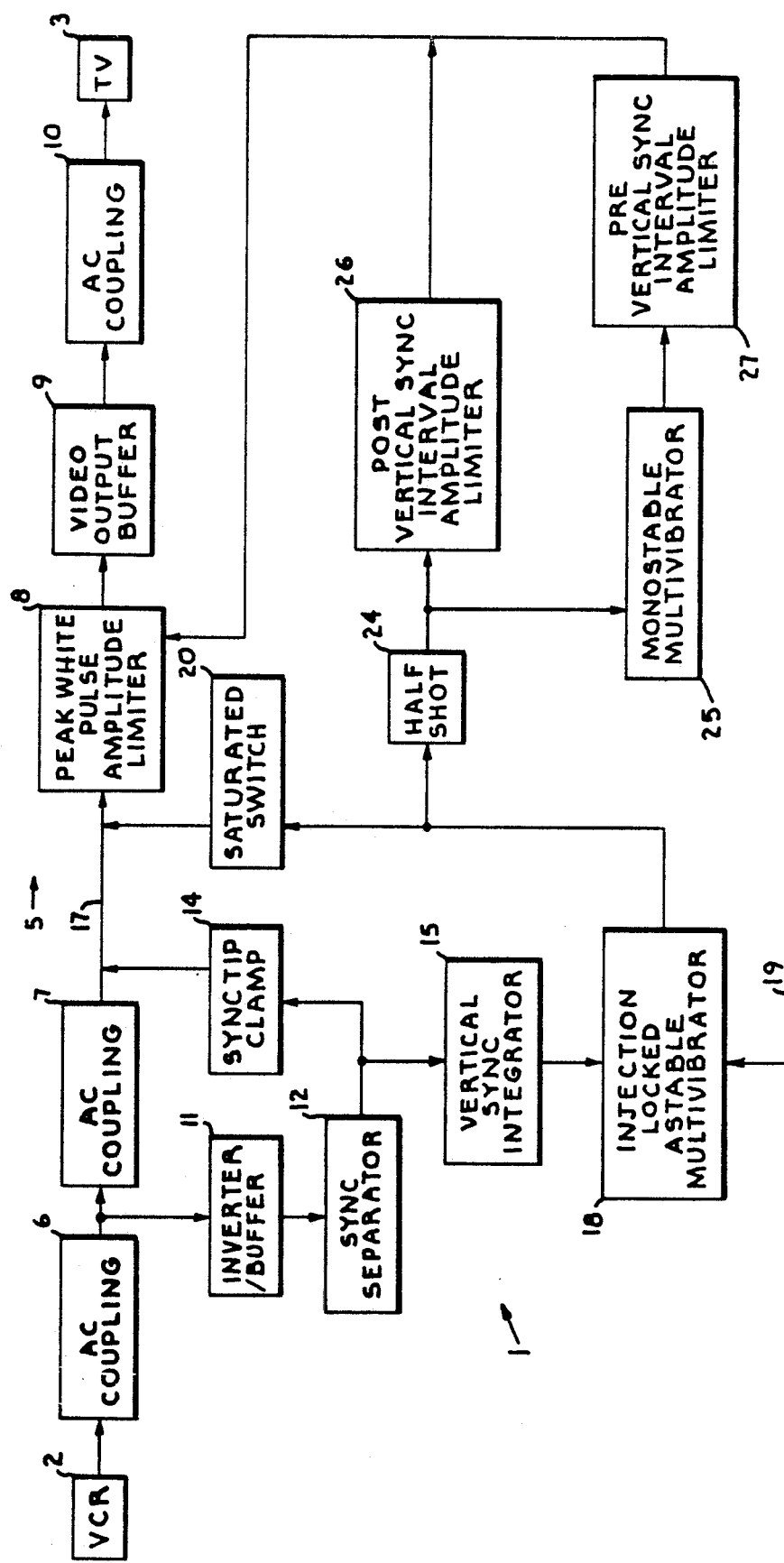
FIG. 1 is a block diagram of a vertical blanking interval standardizer circuit embodying the present invention.

As required, detailed embodiments of the present invention are disclosed herein: however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a vertical blanking interval standardizer circuit embodying the present invention. In general, the circuit 1 detects the vertical blanking interval of a video signal and limits the amplitude of signal components occurring during the vertical blanking interval to a selected blanking level with respect to the synchronizer tip level. The circuit 1 also detects the vertical sync interval and replaces a serrated vertical sync signal by a vertical block sync pulse. The vertical blanking interval is divided into an early interval portion existing from substantially the beginning of the vertical blanking interval until at least the beginning of the vertical sync interval and a late interval portion existing from the end of the vertical sync interval until the end of the vertical blanking interval.

Referring to FIG. 1, all of the component blocks illustrated except for the video cassette recorder (VCR) 2 and the television receiver or set (TV) 3 are components of the circuit 1. A through-path 5 is formed by AC coupling blocks 6 and 7, a peak white pulse amplitude limiter 8, a video output buffer 9, and an AC coupling block 10. A unity gain inverter/buffer stage 11 is connected between the AC coupling blocks 6 and 7 and applies its output to a sync separator or stripper 12. The sync separator 12 is an amplifier or transistor which is biased in such a manner as to conduct only signal components having levels between a sync tip level and a blanking level. In this manner, the horizontal and vertical sync pulses are separated from the video signal. The output of the sync separator 12 is split between a sync tip clamp 14 and a vertical sync intergrator 15. The sync tip clamp 14 includes one or more transistors, one of which acts as a switch 16 (FIG. 2) which is connected between a conductor 17 of the through-path 5 and a ground reference. The sync tip clamp circuitry 14 acts as a DC restorer to the video signal on the through-path 5 by clamping the sync tips to zero volts under the control of the sync separator 12. The blanking level of the video signal in the circuit 1 is set at 0.6 volts positive with respect to the sync tip level.

The vertical sync integrator 15 receives the horizontal and vertical sync pulses from the sync separator 12 and applies its output to an injection locked a stable multivibrator 18 which generates a vertical block sync pulse. The illustrated integrator 15 is an RC network having a time constant such that only the serrated vertical sync components of the video signal will have an output level sufficient to initiate the output of a vertical block sync pulse from the multivibrator 18. The integrator 15 in effect ignores the horizontal sync pulses. Further, the pulse spacing or position of the serrations in the serrated vertical sync signal do not affect the generation of the vertical block sync pulse. A lock adjustment control 19 is connected to the multivibrator 18 to control the timing of its pulse output to manually synchronize the vertical block pulse with the vertical sync interval of the video signal. The multivibrator 18 may be formed using a type 555 timer integrated circuit.

The vertical block sync pulse is applied to the video signal on the through-path 5 to replace the serrated vertical sync component with the vertical block sync pulse. The block sync pulse may be used by a television receiver for vertical field synchronization. Adverse image effects caused in certain television receivers by a serrated vertical sync signal having non-standard pulse spacing are corrected by the replacement of the serrated vertical sync signal with a properly timed vertical block sync pulse. The vertical block sync pulse is operatively applied to the video signal on the conductor 17 through a transistor connected as a saturated switch 20. During the existence of the vertical block sync pulse, the switch 20 short circuits the video signal to the sync tip voltage level of zero volts.

The vertical block sync pulse, particularly its trailing edge, is used as a timing reference for limiting the amplitude of the video signal to effectively remove white or gray level pulses during the vertical blanking interval. The vertical block sync pulse is applied to a late control pulse generator or half shot circuit 24 which generates a late control pulse existing from the trailing edge of the vertical block sync pulse to the end of the vertical blanking interval. The late control pulse, in turn, is applied to an early control pulse generator in the form of a monostable multivibrator or one shot 25. The one shot 25 generates the early control pulse which exists from substantially the beginning of a vertical blanking interval until at least the beginning of the vertical sync interval. The one shot 25 may be formed using a type 555 timer integrated circuit.

The late control pulse is used to activate a post vertical sync interval amplitude limiter or late limiter controller 26 which is connected to the amplitude limiter circuit 8. Similarly, the early control pulse is used to activate a pre-vertical sync interval amplitude limiter or early limiter controller 27 which is connected to the amplitude limiter circuit 8. The early and late limiter controller circuits 26 and 27 are similar in construction and operation and differ only in their active time frames. During activation, the circuits 26 and 27 prebias the amplitude limiter circuit 8 such that it is biased to cutoff by any signal component of the video signal which exceeds the blanking level and substitute the blanking level into the video signal during this cutoff period.

Figure 2:
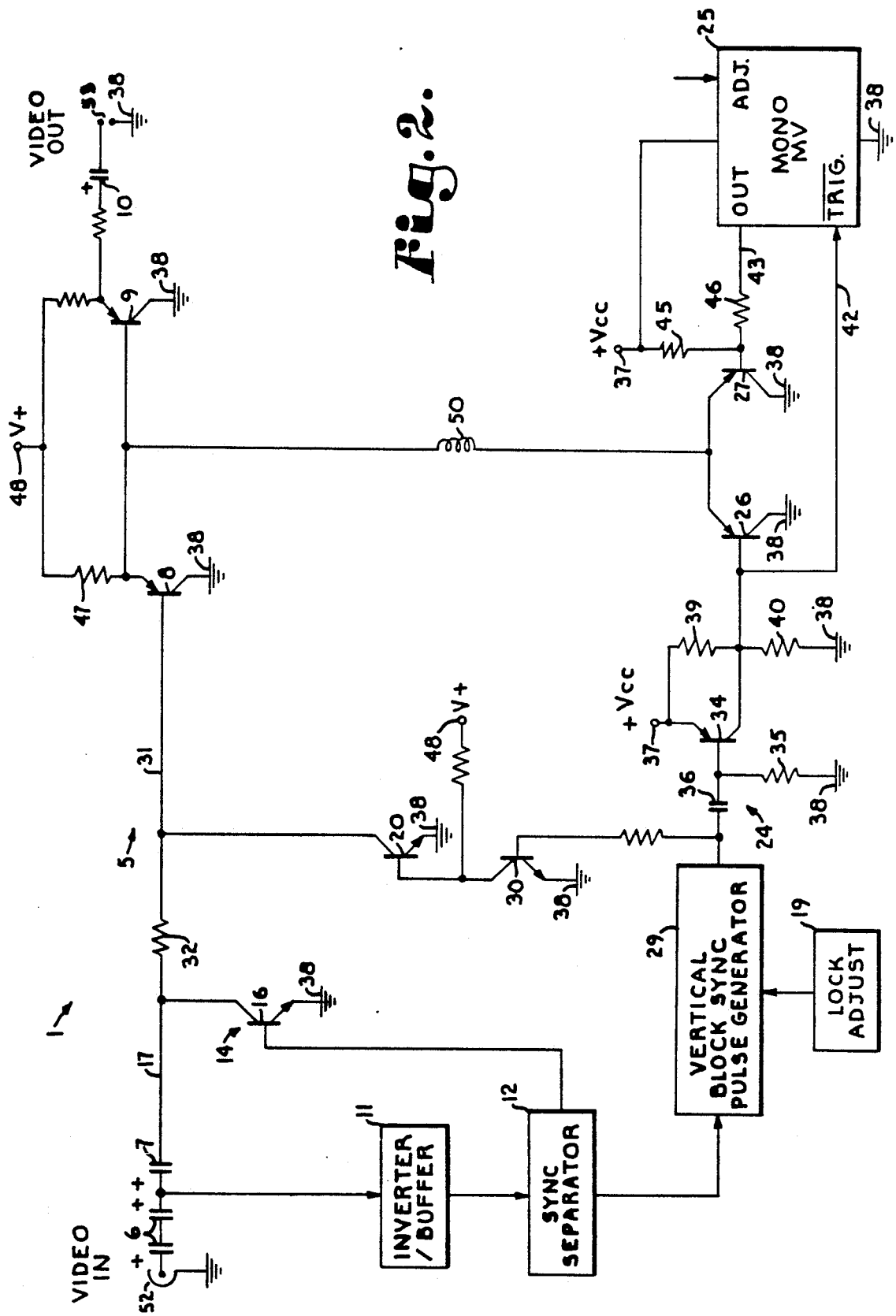
FIG. 2 is a circuit diagram illustrating details of a preferred embodiment of the vertical blanking interval standardizer circuit.

The vertical blanking interval standardizer circuit 1 may be implemented using any appropriate circuit elements and configurations. FIG. 2 illustrates an exemplary embodiment of the circuit 1 using bipolar junction transistors; however, the circuit 1 is not limited to use of such devices. In FIG. 2, the vertical sync integrator 15 and injection locked astable multivibrator 18 are shown combined as a vertical block sync pulse generator 29. The saturated switch transistor 20 is preceded by a transistor 30 which functions as an inverting and biasing stage. The switch 20 is connected to the through-path 5 at a conductor 31 which is separated from the conductor 17 by a resistor 32.

The late control pulse generator 24 is formed by a transistor 34 in combination with an RC timing network including a resistor 35 and a capacitor 36. The configuration of the illustrated late control pulse generator 24 is sometimes referred to as a half shot or a boxcar delay circuit. The half shot 24 is triggered by the positive going trailing edge of the vertical block sync pulse from the block sync pulse generator 29. The transistor 34 is biased to be normally in a conducting or ON condition. The RC timing network causes the transistor 34 to cutoff for an interval extending from the trailing edge of the block sync pulse until the end of the vertical blanking interval. During conduction, the collector of transistor 34 is at a potential 37 of +Vcc which might, for example, be a positive five volts with respect to the circuit ground 38. The collector of transistor 34 is connected to a voltage divider network formed by resistors 39 and 40. When transistor 34 is in a cutoff condition, its collector's potential drops to +0.6 volts. Thus, the late control pulse has a level of +0.6 volts.

The collector of half shot transistor 34 is connected to a trigger input 42 of the early control pulse generating one shot 25. The one shot 25 is triggered into an active state to produce a positive going pulse at its output 43 by a negative going edge of a pulse applied at the trigger input 42. The output pulse of the one shot 25 has a level equal to its supply voltage 37 of +Vcc. In its inactive state, the output of the one shot 25 is at ground potential or zero volts. The early control pulse is "generated" in the inactive state of the one shot 25. The one shot 25 is triggered into its active state by the leading edge of the late control pulse coincident with the trailing edge of the vertical block sync pulse of a given video field. The output 43 remains at a high level until substantially the beginning of the vertical blanking interval of the next video field. At this time, the one shot 25 reverts to its rest state and the output 43 drops to zero volts and remains at this level until retriggered at the end of the vertical sync interval at which time the output 43 again goes high. This low going pulse of the rest state of the one shot 25 is the early control pulse. In the illustrated circuit 1, the early control pulse exists from the time of one horizontal line before the beginning of the vertical blanking interval until the end of the vertical sync interval.

The late and early limiter controllers 26 and 27 are implemented in the circuit 1 of FIG. 2 by late and early limiter controller transistors 26 and 27. The transistors 26 and 27 together with the amplitude limiter transistor 8 are interconnected in a manner similar to a differential amplifier with three inputs instead of two and with the output from the commonly connected emitters instead of from the collectors. The combination of transistors 26, 27 and 8 also share some configurational and operational similarities with a three input transistor-transistor logic (TTL) AND gate.

The configuration, biasing, and effect of transistors 26 and 27 on the operation of transistor 8 is substantially identical; only the time of operation is different. The late controller transistor 26 is biased by the half shot 24 in cooperation with the biasing resistors 39 and 40. The early controller transistor 27 is biased by the one shot 25 in cooperation with biasing resistors 45 and 46. Throughout the image portion of each video field, the bases of transistors 26 and 27 are held at approximately +Vcc. When transistor 34 is conducting, its collector voltage is a +Vcc which is also applied to the base of transistor 26. When one shot 25 is in its active state and outputting +Vcc at output terminal 43, +Vcc is at both ends of the voltage divider network of resistors 45 and 46. Thus, the base of transistor 27, which is connected to the dividing point of resistors 45 and 46, is held at +Vcc. The emitters of transistors 26 and 27 are biased by the emitter bias resistor 47 of transistor 8 which is connected to power supply terminal 48 having a voltage of V+ which may be in the range of 8.5 to 12 volts positive with respect to ground 38. With this arrangement, as long as the late and early control pulses are absent from the bases of transistors 26 and 27, the base-emitter junctions of transistors 26 and 27 are reverse biased; and transistors 26 and 27 have no effect on the passage of video signals having conventional signal levels through transistor 8.

When transistor 34 cuts off, the late control pulse having a level of +0.6 volts is placed on the base of transistor 26. Because of the emitter biasing through resistor 47, the base-emitter junction of transistor 26 is forward biased, and transistor 26 conducts, placing a voltage of about +1.3 volts on its emitter (0.6 volts plus 0.7 volts across the base-emitter junction). Similarly, when the voltage on the output 43 of one shot 25 drops to zero volts, the voltage divider 45/46 places +0.6 volts on the base of late controller transistor 27, and +1.3 volts is translated to its emitter. Either of these conditions places +1.3 volts on the emitter of transistor 8 through a color burst choke inductor 50. This prebiases the emitter of transistor 8 such that any component of the video signal which exceeds +0.6 volts reverses biases the base-emitter junction of transistor 8 cutting it off. While transistor 8 is cut off, its emitter voltage is held at 1.3 volts. Thus, during the early or late portion of the vertical blanking interval, white or gray pulses, which have signal levels exceeding the signal level of +0.6 volts, are effectively eliminated from the video signal. At the end of the vertical blanking interval, transistors 26 or 27 are again placed in their effectively cutoff condition and do not affect the passage of the video signal through transistor 8 until one horizontal line before the next vertical blanking interval.

In use, the circuit 1 is connected in line between the television signal output of a VCR 2 and the antenna input of a television set 3. The circuit 1 may be provided at its input and output with either or both of standard type "F" shielded connectors as shown at the video input 52 of circuit 1 in FIG. 2 or with twin lead screw lug connectors as shown at the video output 53 of circuit 1. The circuit 1 may also be used between an appropriate video output of a VCR 2 and a video monitor (not shown).

It is to be understood that while certain forms of the present invention have been described and illustrated herein, it is not to be limited to the specific forms or arrangement of parts described and shown.

What is claimed and desired to be secured by Letters Patent is as follows:

1. A vertical blanking interval standardizer circuit comprising:
   (a) a controlled limiter amplifier having a video signal passing from an input to an output thereof, said limiter amplifier being biasable to a cutoff state;
   (b) a vertical block sync pulse generator sensing a serated vertical sync interval of said video signal and generating a vertical block sync pulse in synchronism with said serrated vertical sync interval;
   (c) a late control pulse generator connected to said vertical block sync pulse generator and generating a late control pulse beginning at a trailing edge of said vertical block syn pulse and extending to the end of said vertical blanking interval;
   (d) a late amplitude limiter control circuit connected between said late control pulse generator and said controlled limiter amplifier, said late limiter control circuit biasing said amplifier to be in said cutoff state by a peak white level pulse occurring in said video signal during the occurrence of said late control pulse and limiting the output level of said amplifier to a selected blanking level during the occurrence of said peak white level pulse;
   (e) an early control pulse generator connected to said late control pulse generator, said early control pulse generator generating an early control pulse beginning substantially at the beginning of said vertical blanking interval and extending until at least said leading edge of a vertical block syn pulse; and
   (f) an early amplitude limiter control circuit connected between said early control pulse generator and said controlled limiter amplifier, said early limiter control circuit biasing said amplifier to be in said cutoff state by a peak white level pulse occurring in said video signal during the occurrence of said early control pulse and limiting the output level of said amplifier to said selected blanking level during the occurrence of said peak white level pulse occurring during the occurrence of said early control pulse.

2. A circuit as set forth in claim 1 wherein:
   (a) said controlled limiter amplifier is an amplifier transistor having said video signal input to an amplifier base thereof and normally outputting said video signal from an amplifier emitter thereof;
   (b) said late amplitude limiter control circuit is a late controller transistor having said late control pulse input to a late controller base thereof and having a late controller emitter operatively connected to said amplifier emitter, said late controller transistor outputting said selected blanking level on said late controller emitter during the occurrence of said late control pulse; and
   (c) said selected blanking level on said amplifier emitter causes an amplifier base-emitter junction of said amplifier transistor to be reverse biased by said peak white level pulse occurring during the occurrence of said late control pulse thereby placing said amplifier transistor in said cutoff state during the occurrence of said peak white level pulse occurring during the occurrence of said late control pulse.

3. A circuit as set forth in claim 1 wherein:
   (a) said controlled limiter amplifier is an amplifier transistor having said video signal input to an amplifier base thereof and normally outputting said video signal from an amplifier emitter thereof,
   (b) said early amplitude limiter control circuit is an early controller transistor having said early control pulse input to an early controller base thereof and having an early controller emitter operatively connected to said amplifier emitter, said early controller transistor outputting said selected blanking level on said early controller emitter during the occurrence of said early control pulse; and (c) said selected blanking level on said amplifier emitter causes an amplifier base-emitter junction of said amplifier transistor to be reverse biased by said peak white level pulse occurring during the occurrence of said early control pulse thereby placing said amplifier transistor in said cutoff state during the occurrence of said peak white level pulse occurring during the occurrence of said early control pulse.

4. A circuit as set forth in claim 1 wherein said video signal includes a serrated vertical sync signal occurring in said serrated vertical sync interval and including:

(a) vertical sync interval circuit means connected to said vertical block sync pulse generator and processing said video signal to replace said serrated vertical sync signal with said vertical block sync pulse.

5. A circuit as set forth in claim 1 wherein said early control pulse has an early control pulse level and wherein said early control pulse generator includes:

(a) an early control one shot having a trigger input connected to an output of said late control pulse generator and providing at a one shot output terminal one of two levels including said early control pulse level in a rest state of said one shot and a complementary level in an activated state of said one shot;

(b) the output level of said one shot being triggered from said early control level to said complementary level by a leading edge of said late control pulse coincident with said trailing edge of said vertical block sync pulse; and (c) the output level of said one shot remaining at said complementary level until substantially the beginning of the vertical blanking interval of the next filed of said video signal whereby the output level of said one shot is at said early control pulse level from substantially the beginning of a vertical blanking interval until the end of the vertical sync interval of said vertical blanking interval.

6. A circuit as set forth in claim 1 wherein said vertical block sync pulse generator includes:

(a) a sync separator circuit receiving said video signal and outputting only horizontal and vertical sync components of said video signal;

(b) a vertical sync integrator circuit connected to said sync separator circuit, receiving said horizontal and vertical sync components each including a time integral, and outputting a vertical integrator signal including said time integral of the serrated vertical sync signal occurring during the vertical sync interval; and (c) an injection locked astable multivibrator circuit connected to said vertical sync integrator circuit, receiving said vertical integrator signal, and outputting said vertical block syn pulse substantially coincident with the vertical sync interval.

7. A vertical blanking interval standardizer circuit comprising:

(a) limiter amplifier means having a video signal passing from an input to an output thereof, said limiter amplifier means being biasable to a cutoff state;

(b) timing means operatively detecting the occurrence of a vertical blanking interval of said video signal and generating a timing signal indicative of said vertical blanking interval; and (c) limiter control circuit means connected between said amplifier means and said timing means, said control circuit means, in response to said timing signal, biasing said amplifier means to be cutoff by a video signal level occurring in said video signal during said vertical blanking interval which exceeds a selected blanking level and limiting the output level of said amplifier means to said selected blanking level;

(d) said video signal including a vertical sync interval occurring during said vertical blanking interval and wherein;

(e) said timing means including early timing means generating an early timing signal indicating an early portion of said vertical blanking interval beginning substantially at the beginning of said vertical blanking interval and extending until at least the beginning of said vertical sync interval;

(f) said timing means including late timing means generating a late timing signal indicating a late portion of said vertical blanking interval beginning at the end of said vertical sync interval and extending until the end of said vertical blanking interval;

(g) said limiter control circuit means including early limiter control circuit means cooperating with said early timing means to limit the output of said amplifier means during the occurrence of a pulse having a level which exceeds said selected blanking level; and (h) said limiter control circuit means including late limiter control circuit means cooperating with said late timing means to limit the output of said amplifier means during the occurrence of a pulse having a level which exceeds said selected blanking level.

8. A circuit as set forth in claim 7 wherein:

(a) said timing means includes a vertical block sync pulse generator generating a vertical block sync pulse coincident with said vertical sync interval; and (b) said late timing means includes a late control pulse generator receiving said vertical block sync pulse and generating a late control pulse in response to said trailing edge of said vertical block sync pulse, said late control pulse extending from said trailing edge to the end of said vertical blanking interval.

9. A circuit as set forth in claim 8 wherein said early timing means includes:

(a) an early control pulse generator generating an early control pulse extending from substantially the beginning of a vertical blanking interval until at least the beginning of the vertical sync interval of said vertical blanking interval.

10. A circuit as set forth in claim 9 wherein said early control pulse has an early control pulse level and wherein said early control pulse generator includes:

(a) an early control one shot having a trigger input connected to an output of said late control pulse generator and providing at a one shot output terminal one of two levels including said early control pulse level in a rest state of said one shot and a complementary level in an activated state of said one shot;

(b) the output level of said one shot being triggered from said early control level to said complementary level by a leading edge of said late control pulse coincident with said trailing edge of said vertical block sync pulse; and (c) the output level of said one shot remaining at said complementary level until substantially the beginning of the vertical blanking interval of the next field of said video signal whereby the output level of said one shot is at said early control pulse level from substantially the beginning of a vertical blanking interval until the end of the vertical sync interval of said vertical blanking interval.

* * * * *